US010517788B2

(12) United States Patent
Lee et al.

(10) Patent No.: US 10,517,788 B2
(45) Date of Patent: Dec. 31, 2019

(54) POWER TRANSMISSION DEVICE AND MOTION ASSISTANCE DEVICE COMPRISING THE SAME

(71) Applicant: Samsung Electronics Co., Ltd., Suwon-si, Gyeonggi-do (KR)

(72) Inventors: Jongwon Lee, Suwon-si (KR);
Youngjin Park, Seoul (KR);
Byungjune Choi, Gunpo-si (KR);
Jeonghun Kim, Hwaseong-si (KR);
Se-Gon Roh, Suwon-si (KR);
Minhyung Lee, Seoul (KR); Youn Baek Lee, Yongin-si (KR); Hyun Do Choi, Yongin-si (KR)

(73) Assignee: Samsung Electronics Co., Ltd., Gyeonggi-do (KR)

( * ) Notice: Subject to any disclaimer, the term of this patent is extended or adjusted under 35 U.S.C. 154(b) by 697 days.

(21) Appl. No.: 15/156,902

(22) Filed: May 17, 2016

(65) Prior Publication Data

US 2017/0128311 A1    May 11, 2017

(30) Foreign Application Priority Data

Nov. 6, 2015   (KR) .................. 10-2015-0156010

(51) Int. Cl.
*F15B 15/10*   (2006.01)
*F16H 19/06*   (2006.01)
(Continued)

(52) U.S. Cl.
CPC .............. *A61H 3/00* (2013.01); *A61H 1/024* (2013.01); *A61H 1/0244* (2013.01);
(Continued)

(58) Field of Classification Search
CPC ................ A61H 3/00; A61H 2201/149; A61H 2201/1676; A61H 2201/165;
(Continued)

(56) References Cited

U.S. PATENT DOCUMENTS 270,671 A    1/1883   Huffer
593,871 A   11/1897   Bain
(Continued)

FOREIGN PATENT DOCUMENTS

CN    202619918 U   12/2012
DE      867 187 C    2/1953
(Continued)

OTHER PUBLICATIONS

Partial European Search Report dated Mar. 29, 2017 for corresponding EP Application No. 16197113.0.
Extended European Search Report dated Jul. 3, 2017 for the corresponding EP Application No. 16197113.0.
Schertzer, et al. "Metabolic rate of carrying added mass and mass location", Applied Ergonomics, vol. 45, pp. 1422-1432 (2014).

*Primary Examiner* — Quang D Thanh
(74) *Attorney, Agent, or Firm* — Harness, Dickey & Pierce, P.L.C.

(57) ABSTRACT

A power transmission device may include a first power transmission unit configured to connect to an input portion and to receive a power from the input portion, a second power transmission unit configured to deliver the power to an output portion, and a connecting unit configured to connect the first power transmission unit and the second power transmission unit, and to deliver a pressure of a transfer fluid occurring due to the first power transmission unit to the second power transmission unit.

16 Claims, 9 Drawing Sheets

(51) Int. Cl.
*F16H 19/04* (2006.01)
*A61H 3/00* (2006.01)
*A61H 1/02* (2006.01)
*F15B 15/14* (2006.01)
*F15B 7/00* (2006.01)
*F15B 15/06* (2006.01)
*F15B 15/20* (2006.01)

(52) U.S. Cl.
CPC ............ *A61H 1/0266* (2013.01); *F15B 7/001* (2013.01); *F15B 7/003* (2013.01); *F15B 15/1447* (2013.01); *F16H 19/04* (2013.01); *F16H 19/06* (2013.01); *A61H 2201/0165* (2013.01); *A61H 2201/1215* (2013.01); *A61H 2201/1246* (2013.01); *A61H 2201/1409* (2013.01); *A61H 2201/149* (2013.01); *A61H 2201/1463* (2013.01); *A61H 2201/163* (2013.01); *A61H 2201/164* (2013.01); *A61H 2201/165* (2013.01); *A61H 2201/1628* (2013.01); *A61H 2201/1642* (2013.01); *A61H 2201/1676* (2013.01); *F15B 7/008* (2013.01); *F15B 15/065* (2013.01); *F15B 15/10* (2013.01); *F15B 2015/206* (2013.01); *F16H 2019/0681* (2013.01)

(58) Field of Classification Search
CPC ...... A61H 2201/164; A61H 2201/1628; A61H 2201/1463; A61H 1/0266; A61H 1/0244; A61H 1/024; A61H 2201/1409; A61H 2201/163; A61H 2201/1642; A61H 2201/1246; A61H 2201/1215; A61H 2201/0165; F16H 19/06; F16H 19/04; F16H 2019/0681; F15B 15/065; F15B 7/008; F15B 7/003; F15B 7/001; F15B 15/1447; F15B 15/10; F15B 2015/206
See application file for complete search history.

(56) References Cited

U.S. PATENT DOCUMENTS

| | | | | |
|---|---|---|---|---|
| 5,836,205 | A * | 11/1998 | Meyer | F16H 19/04 74/89.17 |
| 7,559,909 | B2 | 7/2009 | Katoh et al. | |
| 8,323,355 | B2 | 12/2012 | Latour | |
| 2003/0000381 | A1 | 1/2003 | Helasuo et al. | |
| 2011/0138803 | A1* | 6/2011 | Gilbert, Jr. | F03G 7/10 60/581 |
| 2011/0166489 | A1* | 7/2011 | Angold | A61H 1/0255 601/34 |
| 2013/0192948 | A1* | 8/2013 | Rothvoss | F15B 15/1447 192/85.19 |
| 2014/0358053 | A1 | 12/2014 | Triolo et al. | |
| 2015/0176685 | A1* | 6/2015 | Kothadia | F16H 19/04 74/30 |
| 2015/0226234 | A1* | 8/2015 | Amundson | A61H 1/0244 60/327 |

FOREIGN PATENT DOCUMENTS

| | | |
|---|---|---|
| GB | 850620 A | 10/1960 |
| JP | 2002-098107 A | 4/2002 |
| JP | 2003-135542 A | 5/2003 |
| JP | 4271712 B2 | 6/2009 |
| JP | 4603479 B2 | 12/2010 |
| JP | 201322708 A | 2/2013 |
| JP | 5303743 B2 | 10/2013 |
| JP | 201418536 A | 2/2014 |
| JP | 5515899 B2 | 6/2014 |
| KR | 10-2008-0048450 | 6/2008 |
| KR | 101430307 B1 | 8/2014 |
| KR | 101430867 B1 | 8/2014 |
| WO | WO-2014/194257 A1 | 12/2014 |

* cited by examiner

POWER TRANSMISSION DEVICE AND MOTION ASSISTANCE DEVICE COMPRISING THE SAME

CROSS-REFERENCE TO RELATED APPLICATION

This application claims under 35 U.S.C. § 119 to Korean Patent Application No. 10-2015-0156010, filed on Nov. 6, 2015, in the Korean Intellectual Property Office, the entire contents of which are incorporated herein by reference in its entirety.

BACKGROUND

1. Field

At least one example embodiment relates to a power transmission module and/or a motion assistance device including the power transmission module.

2. Description of the Related Art

With the onset of rapidly aging societies, an increasing number of persons may experience pain and/or inconvenience from joint issues. Accordingly, there is increasing interest in motion assistance devices that may assist seniors and/or patients having joint issues with walking. Further, for military uses, motion assistance devices for enforcing physical strength are under development.

SUMMARY

Some example embodiments relate to a power transmission device.

In some example embodiments, the power transmission device may include a first transmission configured to receive a power from an input device; a second transmission configured to deliver the power to an output device; and an interface configured to exchange a transfer agent between the first transmission and the second transmission such that a pressure associated with the transfer agent varies based on the power.

In some example embodiments, the power transmission device may further include an input power converter configured to, convert a rotary power from the input portion to a linear power, and deliver the linear power to the first transmission.

In some example embodiments, the input power converter includes an input pinion gear configured to rotate in response to the rotary power provided by the input device; and an input rack gear configured to engage the input pinion gear to move linearly in response to rotation of the input pinion gear and deliver the linear power to the first transmission.

In some example embodiments, the input rack gear includes a first input rack gear and a second input rack gear, and the first transmission includes a first input cylinder configured to receive the linear power from the first input rack gear; and a second input cylinder configured to receive the linear power from the second input rack gear.

In some example embodiments, the second input rack gear faces the first input rack gear based on a position of the input pinion gear.

In some example embodiments, at least one of the first transmission and the second transmission comprises: a cylinder body having the transfer agent therein; and a pressure rod configured to move in a lengthwise direction of the cylinder body to press the transfer agent.

In some example embodiments, the at least one of the first transmission and the second transmission further includes a diaphragm configured to partition an inner space of the cylinder body and to prevent the transfer agent from contacting the pressure rod.

In some example embodiments, a shape of the diaphragm is such that the diagraph includes, a side portion connected to an inner circumference of the cylinder body; and a protruding portion connected to the side portion and extending across a cross section of the cylinder body.

In some example embodiments, the protruding portion is configured to protrude in one of two directions based on a pressure exerted by the pressure rod.

In some example embodiments, the cylinder body includes a first cylinder body; and a second cylinder body configured to couple with the first cylinder body such that the second cylinder body wraps around a portion of an outer surface of the first cylinder body such that a side portion of the diaphragm is between the first cylinder body and the second cylinder body.

In some example embodiments, the at least one of the first transmission and the second transmission includes an elastic body having a first side and a second side, the first side connected to an end surface of the cylinder body and the second side connected to the pressure rod.

In some example embodiments, the power transmission device further includes an output power converter configured to, convert a linear power from the second transmission to a rotary power, and deliver the rotary power to the output device.

In some example embodiments, the output power converter includes an output rack gear configured to move linearly in response to the linear power provided by the second transmission; and an output pinion gear configured to engage the output rack gear to rotate in response to movement of the output rack gear and deliver the rotary power to the output device.

In some example embodiments, the output rack gear includes a first output rack gear and a second output rack gear, and the second power transmission unit includes a first output cylinder configured to transmit the linear power to the first output rack gear; and a second output cylinder configured to transmit the linear power to the second output rack gear.

In some example embodiments, the second output rack gear faces the first output rack gear based on a position of the output pinion gear.

In some example embodiments, the power transmission device further includes an output control device configured to adjust a magnitude of the rotary power delivered from the output power converter to the output device.

In some example embodiments, the output power converter includes an output pinion gear, and the output control device includes, a rotation pulley; and a cable configured to connect the output pinion gear and the rotation pulley.

In some example embodiments, the output power converter includes an output rack gear, and the rotation pulley is connected to one side of the output rack gear.

In some example embodiments, the cable extends, from the rotation pulley, around a portion of the output pinion gear a first time, around a portion of the rotation pulley and then around a portion of the output pinion gear a second time.

In some example embodiments, the output power converter includes an output pinion gear, and the output control device includes a shift gear connected to the output pinion gear.

Some example embodiments relate to motion assistance device.

In some example embodiments, the motion assistance device includes a driver configured to mount to a user at a position corresponding to a proximal part of the user, and to generate a power; a joint assembly corresponding to a distal part of the user, the joint assembly configured to provide an assistance force to the user based on the power; and a power transmission device configured to deliver the power to the joint assembly by pressurizing a transfer agent therein based on the power.

In some example embodiments, the power transmission device includes a first transmission configured to receive the power from the driver; a second transmission configured to deliver the power to the joint assembly; and an interface configured to exchange the transfer agent between the first transmission and the second transmission.

In some example embodiments, the proximal part of the user is a proximal part of a torso of the user.

In some example embodiments, the joint assembly is corresponds to one of a knee joint, an ankle joint, and a hip joint of the user.

In some example embodiments, the motion assistance device further includes an output power converter configured to convert a linear power from the second transmission to a rotary power and to deliver the rotary power to the joint assembly; and an output control device configured to adjust a magnitude of the rotary power.

Additional aspects of example embodiments will be set forth in part in the description which follows and, in part, will be apparent from the description, or may be learned by practice of the disclosure.

BRIEF DESCRIPTION OF THE DRAWINGS

These and/or other aspects will become apparent and more readily appreciated from the following description of example embodiments, taken in conjunction with the accompanying drawings of which.

DETAILED DESCRIPTION

Figure 1:
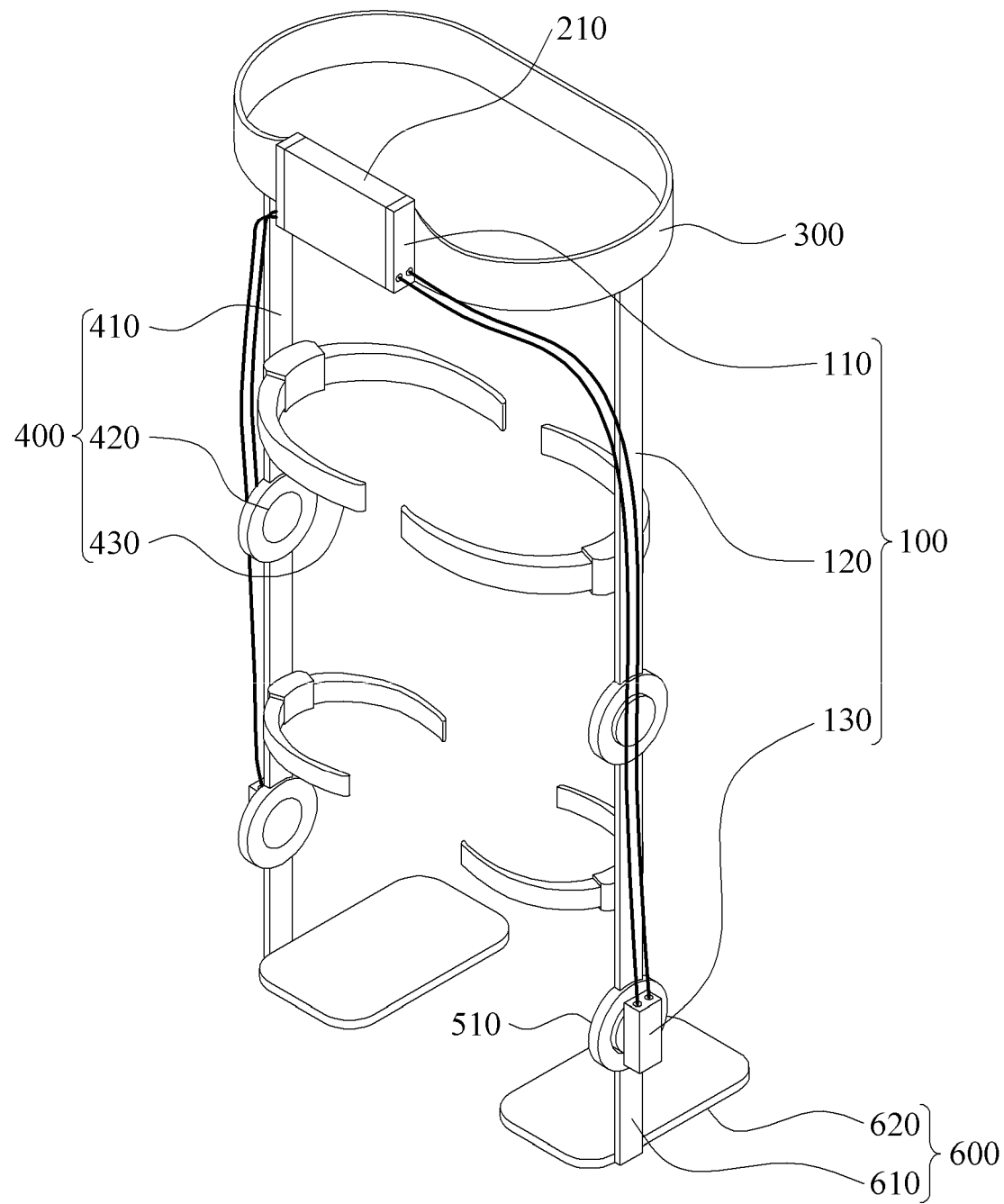
FIG. 1 is a perspective view illustrating a motion assistance device according to at least one example embodiment.

Hereinafter, some example embodiments will be described in detail with reference to the accompanying drawings. Regarding the reference numerals assigned to the elements in the drawings, it should be noted that the same elements will be designated by the same reference numerals, wherever possible, even though they are shown in different drawings. Also, in the description of embodiments, detailed description of well-known related structures or functions will be omitted when it is deemed that such description will cause ambiguous interpretation of the present disclosure.

It should be understood, however, that there is no intent to limit this disclosure to the particular example embodiments disclosed. On the contrary, example embodiments are to cover all modifications, equivalents, and alternatives falling within the scope of the example embodiments. Like numbers refer to like elements throughout the description of the figures.

In addition, terms such as first, second, A, B, (a), (b), and the like may be used herein to describe components. Each of these terminologies is not used to define an essence, order or sequence of a corresponding component but used merely to distinguish the corresponding component from other component(s). It should be noted that if it is described in the specification that one component is "connected", "coupled", or "joined" to another component, a third component may be "connected", "coupled", and "joined" between the first and second components, although the first component may be directly connected, coupled or joined to the second component.

The terminology used herein is for the purpose of describing particular embodiments only and is not intended to be limiting. As used herein, the singular forms "a," "an," and "the," are intended to include the plural forms as well, unless the context clearly indicates otherwise. It will be further understood that the terms "comprises," "comprising," "includes," and/or "including," when used herein, specify the presence of stated features, integers, steps, operations, elements, and/or components, but do not preclude the presence or addition of one or more other features, integers, steps, operations, elements, components, and/or groups thereof.

It should also be noted that in some alternative implementations, the functions/acts noted may occur out of the order noted in the figures. For example, two figures shown in succession may in fact be executed substantially concurrently or may sometimes be executed in the reverse order, depending upon the functionality/acts involved.

Various example embodiments will now be described more fully with reference to the accompanying drawings in which some example embodiments are shown. In the drawings, the thicknesses of layers and regions are exaggerated for clarity.

Example embodiments may be described with reference to acts and symbolic representations of operations (e.g., in the form of flow charts, flow diagrams, data flow diagrams, structure diagrams, block diagrams, etc.) that may be implemented in conjunction with units and/or devices discussed in more detail below. Although discussed in a particularly manner, a function or operation specified in a specific block may be performed differently from the flow specified in a flowchart, flow diagram, etc. For example, functions or operations illustrated as being performed serially in two consecutive blocks may actually be performed simultaneously, or in some cases be performed in reverse order.

Units and/or devices according to one or more example embodiments may be implemented using hardware, software, and/or a combination thereof. For example, hardware devices may be implemented using processing circuity such as, but not limited to, a processor, Central Processing Unit (CPU), a controller, an arithmetic logic unit (ALU), a digital signal processor, a microcomputer, a field programmable gate array (FPGA), a System-on-Chip (SoC), a programmable logic unit, a microprocessor, or any other device capable of responding to and executing instructions in a defined manner.

Software may include a computer program, program code, instructions, or some combination thereof, for independently or collectively instructing or configuring a hardware device to operate as desired. The computer program and/or program code may include program or computer-readable instructions, software components, software modules, data files, data structures, and/or the like, capable of being implemented by one or more hardware devices, such as one or more of the hardware devices mentioned above. Examples of program code include both machine code produced by a compiler and higher level program code that is executed using an interpreter.

For example, when a hardware device is a computer processing device (e.g., a processor, Central Processing Unit (CPU), a controller, an arithmetic logic unit (ALU), a digital signal processor, a microcomputer, a microprocessor, etc.), the computer processing device may be configured to carry out program code by performing arithmetical, logical, and input/output operations, according to the program code. Once the program code is loaded into a computer processing device, the computer processing device may be programmed to perform the program code, thereby transforming the computer processing device into a special purpose computer processing device. In a more specific example, when the program code is loaded into a processor, the processor becomes programmed to perform the program code and operations corresponding thereto, thereby transforming the processor into a special purpose processor.

Software and/or data may be embodied permanently or temporarily in any type of machine, component, physical or virtual equipment, or computer storage medium or device, capable of providing instructions or data to, or being interpreted by, a hardware device. The software also may be distributed over network coupled computer systems so that the software is stored and executed in a distributed fashion. In particular, for example, software and data may be stored by one or more computer readable recording mediums, including the tangible or non-transitory computer-readable storage media discussed herein.

According to one or more example embodiments, computer processing devices may be described as including various functional units that perform various operations and/or functions to increase the clarity of the description. However, computer processing devices are not intended to be limited to these functional units. For example, in one or more example embodiments, the various operations and/or functions of the functional units may be performed by other ones of the functional units. Further, the computer processing devices may perform the operations and/or functions of the various functional units without sub-dividing the operations and/or functions of the computer processing units into these various functional units.

Units and/or devices according to one or more example embodiments may also include one or more storage devices. The one or more storage devices may be tangible or non-transitory computer-readable storage media, such as random access memory (RAM), read only memory (ROM), a permanent mass storage device (such as a disk drive), solid state (e.g., NAND flash) device, and/or any other like data storage mechanism capable of storing and recording data. The one or more storage devices may be configured to store computer programs, program code, instructions, or some combination thereof, for one or more operating systems and/or for implementing the example embodiments described herein. The computer programs, program code, instructions, or some combination thereof, may also be loaded from a separate computer readable storage medium into the one or more storage devices and/or one or more computer processing devices using a drive mechanism. Such separate computer readable storage medium may include a Universal Serial Bus (USB) flash drive, a memory stick, a Blu-ray/DVD/CD-ROM drive, a memory card, and/or other like computer readable storage media. The computer programs, program code, instructions, or some combination thereof, may be loaded into the one or more storage devices and/or the one or more computer processing devices from a remote data storage device via a network interface, rather than via a local computer readable storage medium. Additionally, the computer programs, program code, instructions, or some combination thereof, may be loaded into the one or more storage devices and/or the one or more processors from a remote computing system that is configured to transfer and/or distribute the computer programs, program code, instructions, or some combination thereof, over a network. The remote computing system may transfer and/or distribute the computer programs, program code, instructions, or some combination thereof, via a wired interface, an air interface, and/or any other like medium.

The one or more hardware devices, the one or more storage devices, and/or the computer programs, program code, instructions, or some combination thereof, may be specially designed and constructed for the purposes of the example embodiments, or they may be known devices that are altered and/or modified for the purposes of example embodiments.

A hardware device, such as a computer processing device, may run an operating system (OS) and one or more software applications that run on the OS. The computer processing device also may access, store, manipulate, process, and create data in response to execution of the software. For simplicity, one or more example embodiments may be exemplified as one computer processing device; however, one skilled in the art will appreciate that a hardware device may include multiple processing elements and multiple types of processing elements. For example, a hardware device may include multiple processors or a processor and a controller. In addition, other processing configurations are possible, such as parallel processors.

FIG. 1 is a perspective view illustrating a motion assistance device according to some example embodiments.

Referring to FIG. 1, a motion assistance device 10 may be worn around a user and may assist a motion of the user. The user may be, for example, a human being, an animal, or a robot, however, the example embodiments are not limited thereto. Further, although FIG. 1 illustrates an example in which the motion assistance device 10 assists a motion of an ankle portion of the user, the motion assistance device 10 may also assist another portion of an upper body, such as a hand, an upper arm, a lower arm, etc., or another portion of a lower body, such as a hip, a knee, a foot, a calf, etc. That is, the motion assistance device 10 may assist a motion of a portion of the user.

Hereinafter, for clarity, a description will be made based on an example in which the motion assistance device 10 assists a lower body of a user, particularly, a motion of an ankle portion of the user.

The motion assistance device 10 may include a power transmission module 100, a driving module 210, a fixing module 300, a side module 400, a joint module 510, a supporting module 600, and a controller (not shown).

The fixing module 300 may be attached to the user. The fixing module 300 may be in contact with at least a portion of an external body of the user. The fixing module 300 may support the rear of the user and a portion of the fixing module 300 may be provided in a shape to wrap around the exterior of the user along the exterior of the user. For example, the fixing module 300 may be fixed to a back of the user and may partially wrap around a waist of the user.

Although not illustrated, the fixing module 300 may include a length adjustment device configured to adjust a length of the fixing module 300 to fit for the user. For example, the length adjustment device may include a buckle structure, a rack-and-pinion structure, a hook and loop structure, or an elastic body structure.

In the case of employing the rack-and-pinion structure, the fixing module 300 may include a plurality of frames. A rack gear and a pinion gear each in which each frame is formed may slide through mutual engagement, thereby adjusting the length of the fixing module 300. Alternatively, in the case of employing the hook and loop structure, the length of the fixing module 300 may be adjusted by modifying an attachment position of one of the hook and loop members. As another example, in the case of employing the elastic body structure, the length of the fixing module 300 may be adjusted by extending a length of an elastic body in correspondence to the circumference of a wearing portion of the user.

The driving module 210 may supply a power to be delivered to the joint module 510, which will be described below. The driving module 210 may be mounted to a portion of the fixing module 300. The driving module 210 may include an actuator configured to be supplied with voltage or current and to generate the power. In this instance, at least a portion of the driving module 210 may be received in a box and thereby be mounted to the fixing module 300.

The driving module 210 may be provided at a position corresponding to a proximal part of the user. The proximal part of the user may indicate a center portion of the user, such as a back, a waist, a torso, etc. For example, the fixing module 300 may be configured to wrap around the waist of the user and the driving module 210 may be provided to the fixing module 300 and thereby be mounted at a position corresponding to the proximal part of the user.

Compared to a case in which the driving module 210 is mounted to an end portion of the body, such as an ankle, a hand, etc., when the driving module 210 is mounted to the proximal part of the user, the user may have to exert less energy due to mounting of the driving module 210. That is, by mounting the driving module 210 to the proximal part of the user, burden applied to the user due to the weight of the driving module 210 may be reduced.

Also, by mounting the driving module 210 with a desired thickness to the proximal part of the user, a thickness of the joint module 510 may be reduced. For example, the motion assistance device 10 may be configured in a slim structure so that the user may wear the motion assistance device 10 beneath clothing.

The side module 400 may configure a body of the motion assistance device 10 and may support the side of the user. For example, the side module 400 may extend along a thigh and a leg of the user from the side of the fixing module 300.

The side module 400 may include a plurality of side supporting bodies 410. For example, the side supporting bodies 410 may be provided to a thigh and a calf, respectively, and may be connected to each other using a joint 420. That is, the joint 420 may be provided to be adjacent to a joint portion of the user between the thigh and the calf and the side module 400 may perform a similar movement to the body.

A front supporting body 430 may extend from one side of the side supporting body 410 and may wrap around a portion of the body of the user. For example, the front supporting body 430 may be configured to wrap around the thigh and/or the calf of the user.

The joint module 510 may receive the power from the driving module 210 and may provide an assistance force to a portion of motion of the user. The joint module 510 may be mounted at a position corresponding to a distal part of the user. For example, the joint module 510 may be disposed at a position corresponding to a joint portion, such as an ankle, a knee, a hip joint, or a femoral region of the user, and may assist a motion of the user.

The joint module 510 may be connected to the side supporting body 410. The joint module 510 may connect the plurality of side supporting bodies 410 or may connect the side supporting body 410 and the supporting module 600, which will be described below.

The joint module 510 may include a rotatable member and may rotate by a movement of the user or with the power supplied from an outside.

The supporting module 600 may support a portion of the user and may partially assist a motion of the user. The supporting module 600 may include a supporting frame 620 configured to rotate through connection to the joint module 510 and a supporting member 610 configured to wrap around a portion of the user.

For example, the supporting member 610 may be configured to partially wrap around a foot of the user, and the supporting member 610 and the supporting frame 620 may be driven through connection, thereby assisting a movement of the foot. Here, a configuration of the supporting module 600 is not limited to the above example and the supporting module 600 may support a thigh, a calf, etc., of the user. The joint module 510 may deliver the power to the supporting module 600.

The power transmission module 100 may include a first power transmission unit 110, a connecting unit 120 and a second power transmission unit 130.

The power transmission module 100 may connect the driving module 210 and the joint module 510, and may deliver the power generated at the driving module 210 to the joint module 510. Using the power, the joint module 510 may rotate the supporting module 600 to assist a motion of the user.

The power transmission module 100 may connect the driving module 210 and the joint module 510 that are separate from each other.

For example, the driving module 210 may be connected to the first power transmission unit 110, and the joint module 510 may be connected to the second power transmission unit 130.

The power generated at the driving module 210 may be used to pressurize a transfer fluid within the first power transmission unit 110, and the pressurized transfer fluid may be delivered to the second power transmission unit 130 through the connecting unit 120. For example, the power may be delivered by delivering the pressure of the transfer fluid generated at the first power transmission unit 110 to the second power transmission unit 130.

The controller (not shown) may include a memory and a processor.

The memory may be a non-volatile memory, a volatile memory, a hard disk, an optical disk, and a combination of two or more of the above-mentioned devices. The memory may be a non-transitory computer readable medium. The non-transitory computer-readable media may also be a distributed network, so that the program instructions are stored and executed in a distributed fashion. The non-volatile memory may be a Read Only Memory (ROM), a Programmable Read Only Memory (PROM), an Erasable Programmable Read Only Memory (EPROM), or a flash memory. The volatile memory may be a Random Access Memory (RAM).

The processor may be implemented by at least one semiconductor chip disposed on a printed circuit board. The processor may be an arithmetic logic unit, a digital signal processor, a microcomputer, a field programmable array, a programmable logic unit, a microprocessor or any other device capable of responding to and executing instructions in a defined manner.

The processor may be programmed with instructions that configure the processor into a special purpose computer to instruct the driving module 210 to generate power and to transmit the generated power to the joint module 510 via the transfer agent included in the power transmission module 100.

Hereinafter, the power transmission module 100 will be further described with reference to FIGS. 2 and 3.

Figure 2:
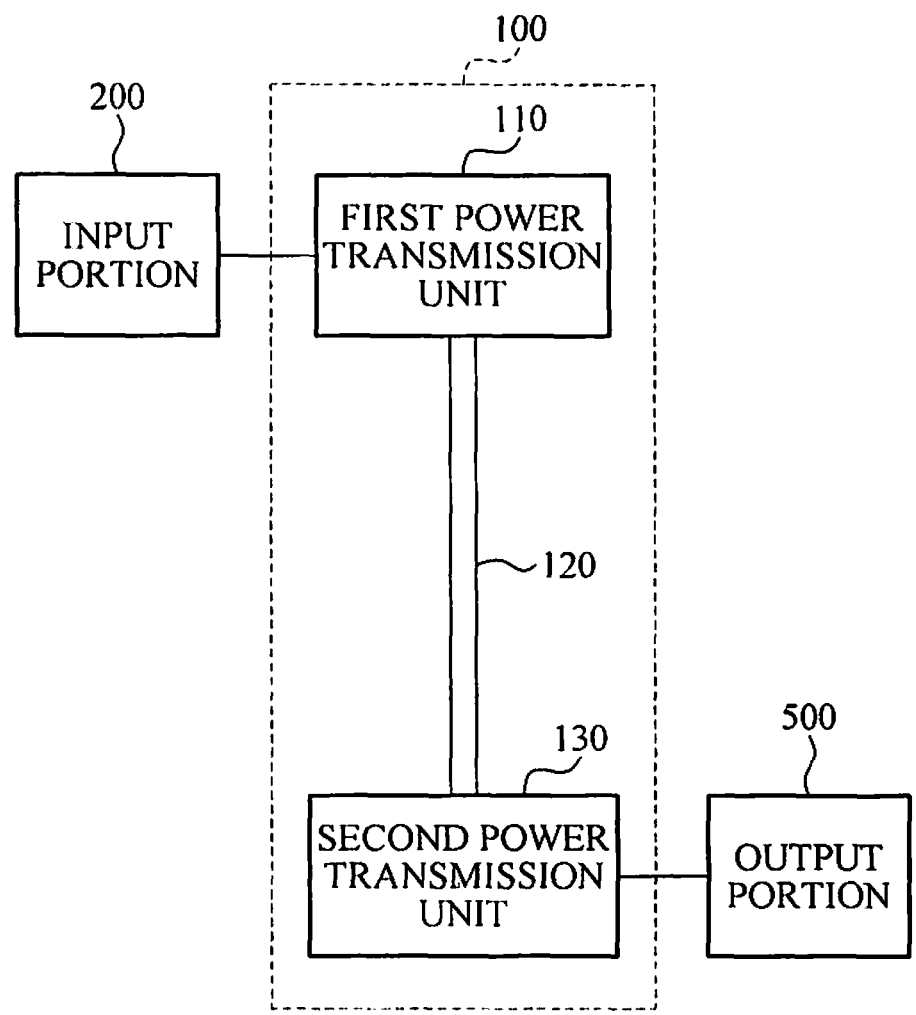
FIG. 2 is a block diagram illustrating a configuration of a power transmission module according to at least one example embodiment.
Figure 3:
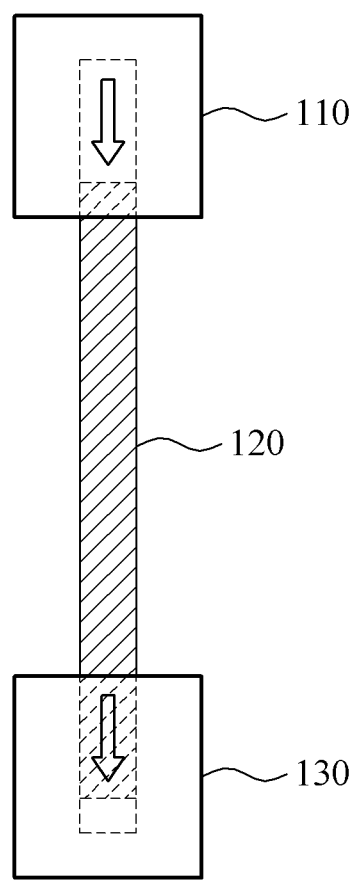
FIG. 3 illustrates an example in which a transfer fluid of a power transmission module is delivered according to at least one example embodiment.

FIG. 2 is a block diagram illustrating a configuration of a power transmission module according to some example embodiments, and FIG. 3 illustrates an example in which the transfer fluid of the power transmission module is delivered according to some example embodiments.

Referring to FIGS. 2 and 3, the power transmission module 100 may deliver a power input from an input portion 200 to an output portion 500 that is separate from the input portion 200.

The power transmission module 100 may have a transfer agent therein. The transfer agent may include a transfer fluid, such as water or hydraulic oil, and may include a transfer gas, such as compressed air. For example, the power transmission module 100 may deliver the power using oil pressure, hydraulic pressure, or hydraulic pneumatic pressure. Hereinafter, the transfer agent will be described as the transfer fluid, however, example embodiments are not limited thereto.

The first power transmission unit 110 may be connected to the input portion 200 at which the power is generated and may receive the external power. For example, the input portion 200 of FIG. 2 may refer to the driving module 210 of FIG. 1, which is controlled via the controller (not shown).

The received external power may be used to pressurize the transfer fluid included in the first power transmission unit 110. The pressurized transfer fluid may be delivered to the connecting unit 120 that is connected to one side of the first power transmission unit 110.

The connecting unit 120 may include a tube through which the transfer fluid may pass. The connecting unit 120 may extend along the side supporting body 410.

The connecting unit 120 may be formed using a flexible material. Accordingly, although the side supporting body 410 includes a curved or bent joint, the connecting unit 120 may extend along the side supporting body 410. Alternatively, in response to the side supporting body 410 that rotates as the user walks, a portion of the connecting unit 120 may be bent and a state in which the side supporting body 410 is positioned on the side of the user may be maintained.

The connecting unit 120 may be in the form of a wound up spiral coil that may extend based on a lengthwise direction of the connecting unit 120.

For example, the connecting unit 120 may be provided in a spiral form around the joint 420. In response to the joint 420 that rotates as the user walks, a bending section may occur in the connecting unit 120. The power transmission efficiency may be maintained in the bending section by forming the bending section of the connecting unit 120 to be spirally wound up.

One side of the connecting unit 120 may be connected to the first power transmission unit 110 and another side of the connecting unit 120 may be connected to the second power transmission unit 130.

The second power transmission unit 130 may receive the transfer fluid from the first power transmission unit 110 through the connecting unit 120. The transfer fluid may generate the power by pressuring a pressure rod 114 of the second power transmission unit 130, which will be described below in reference to FIGS. 5A and 5B.

The second power transmission unit 130 may be connected to the output portion 500 driven by the power and may deliver the power to an outside. For example, the output portion 500 of FIG. 2 may refer to the joint module 510 of FIG. 1.

In the power transmission module 100 constructed as above, the power is delivered by transferring the transfer fluid via an inside of the connecting unit 120. Therefore, the power transmission module 100 may reduce (or, alternatively, prevent) a friction issue that may arise if the power was transmitted via other modes, for example, via cables.

For example, when the bending section occurs in the motion assistance device 10, the connecting unit 120 may contact the side module 400. However, regardless of whether the connecting unit 120 is in contact with the side module 400, the pressure of the transfer fluid may be delivered through the inside of the connecting unit 120 without experiencing a frictional force due to the contact, thereby preventing power loss by the friction of the connecting unit 120.

Since tension of the connecting unit 120 is uniformly maintained regardless of the power delivery, the connecting unit 120 may be maintained in a flexible state. Accordingly, wearing sensation of the user and usability may be enhanced.

Hereinafter, constituent elements of the power transmission unit 100 will be described.

Figure 4:
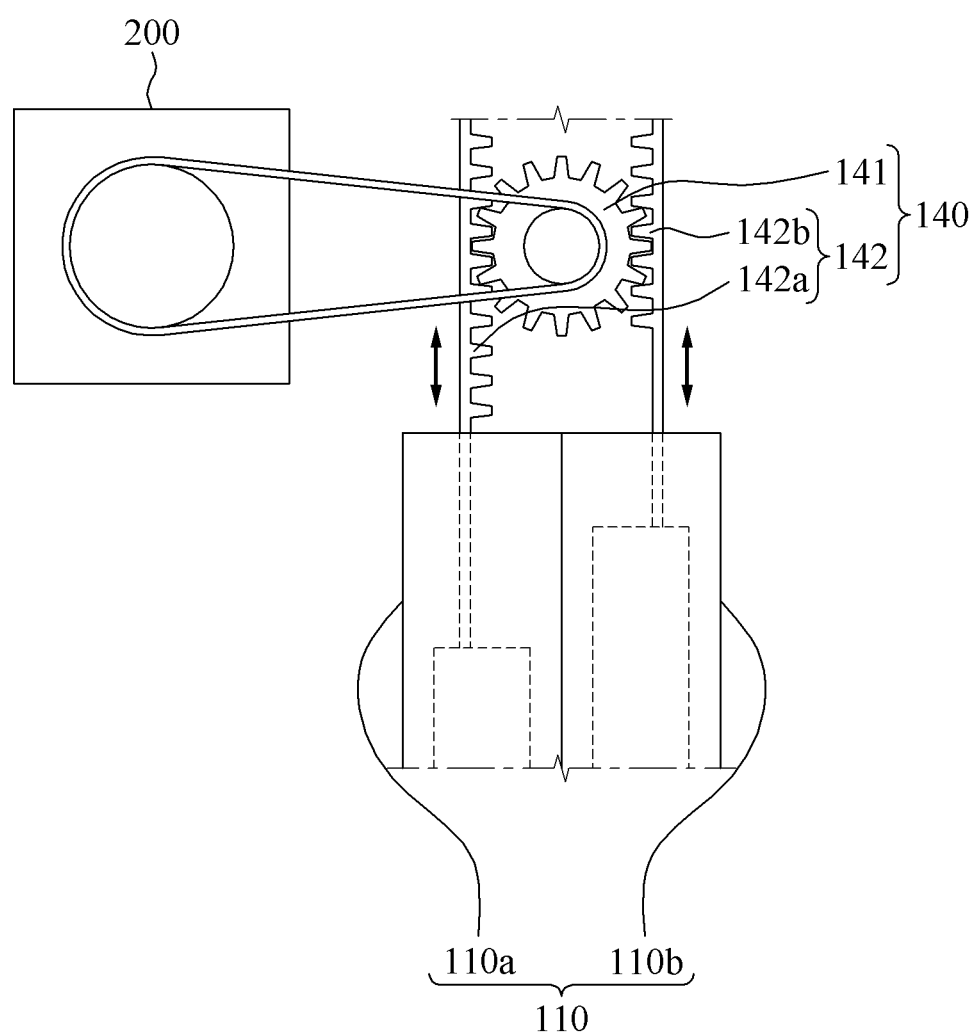
FIG. 4 illustrates an operation of an input power converting unit according to at least one example embodiment.

FIG. 4 illustrates an operation of an input power converting unit according to some example embodiments.

Referring to FIG. 4, an input power converting unit 140 may connect the input portion 200 and the first power transmission unit 110. The input power converting unit 140 may convert a rotary power of the input portion 200 to a linear power and may deliver the converted linear power to the first power transmission unit 110. The linear power may be used to pressurize an internal space 118 (illustrated in FIGS. 5A and 5B) of the first power transmission unit 110.

The input power converting unit 140 may convert the power using a rack-and-pinion structure.

The input power converting unit 140 may include an input pinion gear 141 and an input rack gear 142. The input pinion gear 141 may be connected to the input portion 200. For example, the input pinion gear 141 may be connected to the input portion 200 using a belt.

The input rack gear 142 may be disposed in a lengthwise direction of the first power transmission unit 110. The input rack gear 142 may be configured to engage into the input pinion gear 141, and the input rack gear 142 may be driven linearly in the lengthwise direction of the first power transmission unit 110 in response to driving of the input pinion gear 141.

The input rack gear 142 may be connected to the first power transmission unit 110. For example, a portion of the input rack gear 142 may be extended to the inward side of the first power transmission unit 110, or may be connected to the pressure rod 114 (illustrated in FIGS. 5A and 5B).

The first power transmission unit 110 may include a plurality of cylinders. For example, the first power transmission unit 110 may include a first input cylinder 110a and a second input cylinder 110b.

The input rack gear 142 may include a first input rack gear 142a and a second input rack gear 142b.

The first input rack gear 142a and the second input rack gear 142b may be disposed in the lengthwise direction of the first input cylinder 110a and the second input cylinder 110b, respectively, and may be connected to the first input cylinder 110a and the second input cylinder 110b, respectively.

The first input rack gear 142a and the second input rack gear 142b may be provided in a shape corresponding to the input pinion gear 141. The first input rack gear 142a and the second input rack gear 142b may be disposed on both sides of the input pinion gear 141, respectively. That is, the second input rack gear 142b may be disposed to face the first input rack gear 142a based on a position of the input pinion gear 141.

The first input rack gear 142a and the second input rack gear 142b may be drive in opposite directions by driving of the input pinion gear 141. For example, when the first input rack gear 142a descends, the second input rack gear 142b may ascend. Conversely, when the first input rack gear 142a ascends, the second input rack gear 142b may descend.

Here, when the first input rack gear 142a descends, the first input rack gear 142a may move inward to the first input cylinder 110a to discharge the transfer fluid. When the first input rack gear 142a ascends, the second input rack gear 142b may move inward to the second input cylinder 110b to discharge the transfer fluid.

That is, since the first input rack gear 142a and the second input rack gear 142b discharge the transfer fluid alternately to deliver the power to the second power transmission unit 130, the power transmission efficiency may be enhanced.

Hereinafter, the second power transmission unit 130 will be further described.

Figure 5A:
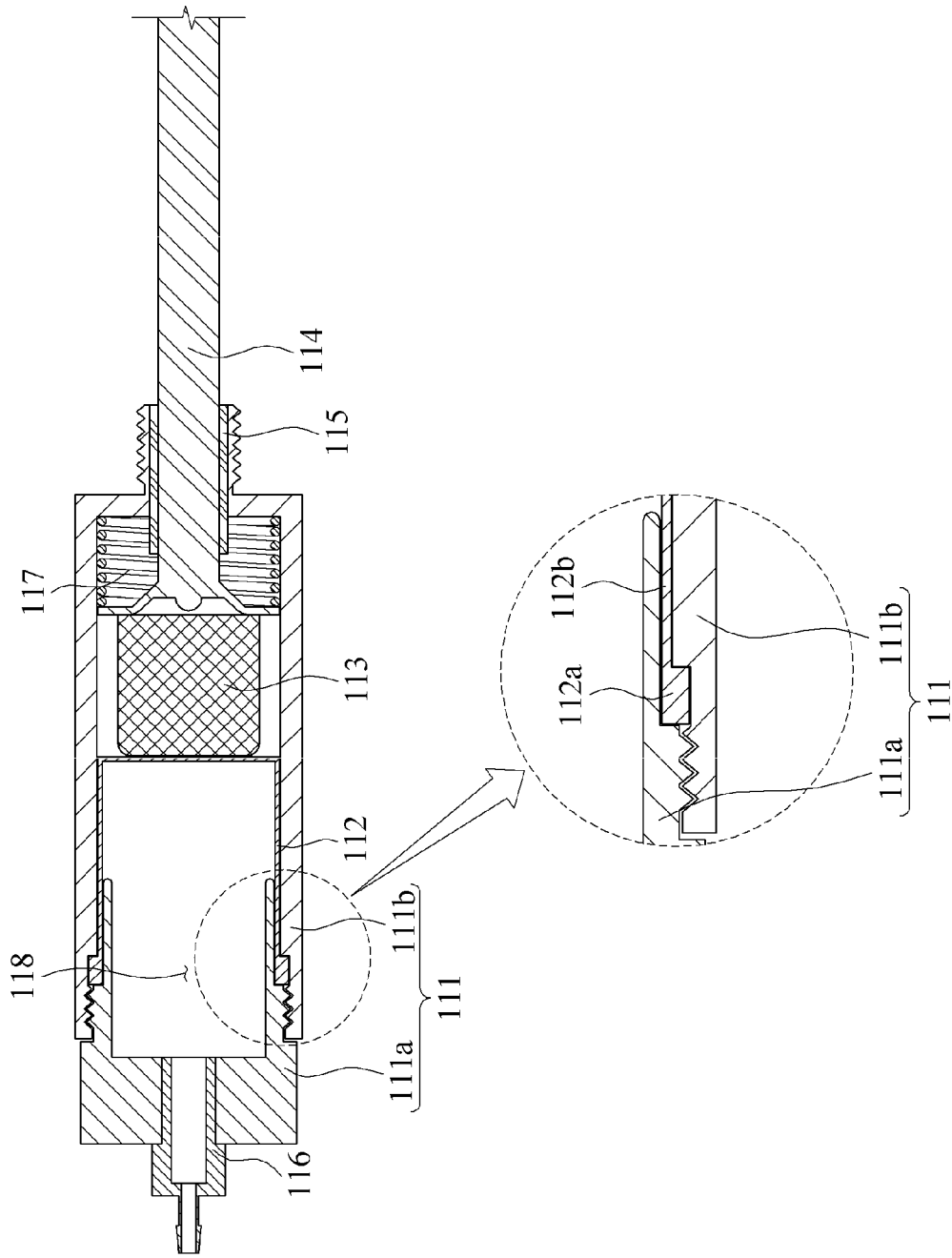
FIGS. 5A and 5B are cross-sectional views illustrating an internal structure of a first input cylinder according to at least one example embodiment.
Figure 5B:
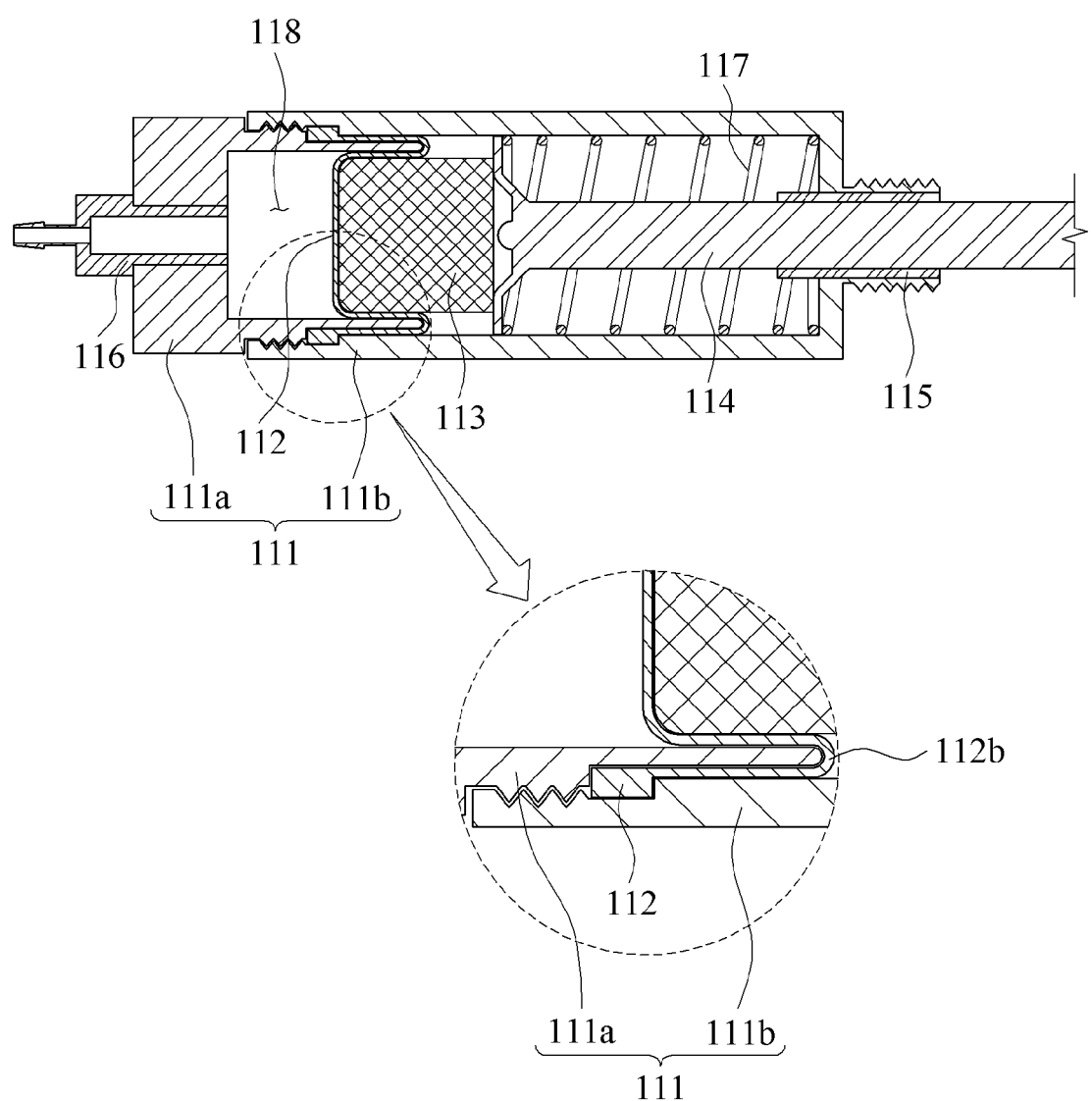

FIGS. 5A and 5B are cross-sectional views illustrating an internal structure of a first input cylinder according to some example embodiments.

FIG. 5A illustrates a state in which the internal space 118 of the first input cylinder 110a is not pressurized, and FIG. 5B illustrates a state in which the internal space 118 of the first input cylinder 110a is pressurized.

The first power transmission unit 110 may include the first input cylinder 110a and the second input cylinder 110b, and the second power transmission unit 130 may include a first output cylinder 130a and a second output cylinder 130b.

The first power transmission unit 110 and the second power transmission unit 130 may include the same configuration. That is, the first input cylinder 110a, the second input cylinder 110b, the first output cylinder 130a, and the second output cylinder 130b may include the same configuration.

Hereinafter, for clarity of description, description will be made based on an internal structure of the first input cylinder 110a. Unless described otherwise, the following description may be applicable to the second input cylinder 110b, the first output cylinder 130a, and the second output cylinder 130b.

The first input cylinder 110a may include a cylinder body 111 having a first cylinder body 111a and a second cylinder body 111b coupled together. That is, the first cylinder body 111a and the second cylinder body 111b may configure both sides of the cylinder body 111, respectively.

For example, the first cylinder body 111a and the second cylinder body 111b may be forcefully coupled with each other through sliding. Alternatively, a male screw thread may be formed at the exterior of the first cylinder body 111a and a female screw thread may be formed at the interior of the second cylinder body 111b whereby the first cylinder body 111a and the second cylinder body 111b may be coupled with each other while the second cylinder body 111b wraps around a portion of the exterior of the first cylinder body 111a.

The internal space 118 may be formed in the cylinder body 111. A discharging portion 116 may be formed on one side of the internal space 118 and the pressure rod 114 may be disposed on another side of the internal space 118.

The transfer agent may be received in the cylinder body 111. As described above, the transfer agent may include fluid such as water or hydraulic oil and may include gas such as compressed air.

The discharging portion 116 may be connected to the connecting unit 120, and the pressure rod 114 may be connected to the driving module 210 or the input power converting unit 140. When the pressure rod 114 moves inward relative to the cylinder body 111, the pressure rod 114 may pressurize the internal space 118 and the transfer fluid may be discharged through the discharging portion 116.

The pressure rod 114 may be disposed in a lengthwise direction of the cylinder body 111. The pressure rod 114 may be connected to a rack gear (not shown) or may be integrally formed with the rack gear. The pressure rod 114 may adjust a size of the internal space 118 by moving in the lengthwise direction of the cylinder body 111.

A friction reduction member 115 may be configured to encircle a portion of the pressure rod 114. The friction reduction member 115 may be disposed between the pressure rod 114 and the cylinder body 111 to reduce a friction between the pressure rod 114 and the inner surface of the cylinder body 111. The friction reduction member 115 may include a rod bushing.

The first power transmission unit 110 may include a diaphragm 112. The diaphragm 112 may partition the internal space 118.

For example, the transfer fluid may be received in one side of the internal space 118 that is divided based on the diaphragm 112. The one side of the internal space 118 may be connected to the discharging portion 116.

The pressure rod 114 may be received in another side of the internal space 118 that is divided based on the diaphragm 112. The pressure rod 114 may pressurize the diaphragm 112 on the other side of the internal space 118, and the pressurized diaphragm 112 may pressurize the one side of the internal space 118.

The diaphragm 112 may prevent the transfer fluid from flowing in the pressure rod 114. That is, since the transfer fluid received in the one side of the internal space 118 is not delivered to the other side of the internal space 118, it is possible to prevent the transfer fluid from flowing out to the outside. Accordingly, the power transmission module 100 may continuously operate without using a pump to additionally supply fluid or a supply device of the transfer fluid.

To enhance the sealing effect of the diaphragm 112, a portion of the diaphragm 112 may be received between the first cylinder body 111a and the second cylinder body 111b.

For example, as described above, the second cylinder body 111b may be coupled to the first cylinder body 111a with partially covering the outer surface of the first cylinder body 111a.

A portion of the diaphragm 112 may be disposed between the first cylinder body 111a and the second cylinder body 111b.

For example, a portion of the diaphragm 112 may be disposed to be in contact with the outer surface of the first cylinder body 111a and may be coupled to the second cylinder body 111b. When the first cylinder body 111a and the second cylinder body 111b are coupled, a portion of the first cylinder body 111a, a portion of the diaphragm 112, and a portion of the second cylinder body 111b may be disposed to overlap.

The diaphragm 112 may include a side portion 112a and a protruding portion 112b. The side portion 112a may be formed along the inner surface of the cylinder body 111, and the protruding portion 112b may be formed from one side of the side portion 112a in the lengthwise direction of the cylinder body 111.

The side portion 112a may be received in an accommodation space formed by coupling the first cylinder body 111a and the second cylinder body 111b.

Due to interference between both sides of the side portion 112a and the first and second cylinder bodies 111a and 111b, a movement of the side portion 112a in the lengthwise direction of the cylinder body 111 may be limited.

That is, since one side of the side portion 112a is fixed to the cylinder body 111, the first input cylinder 110a may prevent the side portion 112a from dislocating from a position between the first cylinder body 111a and the second cylinder body 111b when the diaphragm 112 is pressurized in response to the movement of the pressure rod 114.

The diaphragm 112 may be formed using an elastic material and may be provided in a hollow shape. In particular, since the protruding portion 112b is provided in a hollow shape, a shape of the protruding portion 112b may be easily deformed by the pressure.

The protruding portion 112b may be received in the cylinder body 111 in such a manner that the side of the protruding portion 112b is formed along the inner surface of the cylinder body 111 and the front of the protruding portion 112b is provided in a cross-sectional shape of the cylinder body 111. In a state in which the pressure rod 114 does not pressurize the internal space 118, the protruding portion 112b may protrude toward the pressure rod 114 based on the side portion 112a.

In detail, a portion of the side of the protruding portion 112b may be in contact with the outer surface of the first cylinder body 111a and the inner surface of the second cylinder body 111b. For example, the protruding portion 112b may be formed to correspond to the internal space 118 to seal the internal space 118. For example, in the uncompressed state, the protruding portion 112b may form a C shape facing with an opening of the C-shape facing the discharge portion 116.

A piston 113 may be disposed between the pressure rod 114 and the diaphragm 112. The pressure rod 114 may pressurize the diaphragm 112 directly or through the piston 113.

An elastic body 117 may provide an elastic force to the pressure rod 114. For example, one side of the elastic body 117 may be disposed on the inner surface of the cylinder body 111 and another side of the elastic body 117 may be connected to the pressure rod 114. The elastic body 117 may provide an assistance force to the pressure rod 114 and may be compressed in a state in which the pressure rod 114 does not pressurize the internal space 118.

Referring to FIG. 5B, in response to the pressure rod 114 pressurizing the internal space 118, the protruding portion 112b may be deformed.

For example, in a state in which the pressure rod 114 pressurizes the piston 113 and the piston 113 is in contact with the protruding portion 112b, the pressure rod 114 may pressurize the protruding portion 112b. Accordingly, the protruding portion 112b may be indented into a direction in which the transfer fluid is discharged, that is, toward the discharging portion 116. For example, in the compressed state, the protruding portion 112b may form a C shape facing with an opening of the C-shape facing the pressure rod 114.

A diameter of the pressure rod 114 may be formed to correspond to a diameter of the second cylinder body 111b.

A diameter of the piston 113 may be formed to correspond to a diameter of the first cylinder body 111a.

The diameter of the piston 113 may be formed to be less than a diameter of one end of the pressure rod 114. That is, in a contact portion between the piston 113 and the pressure rod 114, the diameter of the pressure rod 114 may be formed to be greater than the diameter of the piston 113. The piston 113 may be attached or coupled to the pressure rod 114 and thereby be positioned at the center of the cylinder body 111.

In response to the piston 113 pressurizing the protruding portion 112b, the protruding portion 112b may be indented and the piston 113 may be inserted into the first cylinder body 111b. That is, the protruding portion 112b may protrude toward the pressure rod 114 based on the side portion 112a in an initial state of FIG. 5A, and may be deformed to protrude toward the discharging portion 116 by pressure of the piston 113, as illustrated in FIG. 5B.

When the protruding portion 112b is deformed, a portion of the protruding portion 112b may extend along the inner surface of the first cylinder body 111a.

For example, while the protruding portion 112b is being deformed, a portion of the protruding portion 112b may be indented into an inside of the first cylinder body 111a and the indented surface may be in contact with the inner surface of the first cylinder body 111a.

The diameter of the first cylinder body 111a may be formed to be less than the diameter of the second cylinder body 111b. Thus, while the protruding portion 112b is being indented, a portion of the first cylinder body 111a may be enclosed and the indentation of the protruding portion 112b may be limited. According, it is possible to limit a deformation level of the diaphragm 112 and to prevent the protruding portion 112b from being excessively indented to thereby damage the diaphragm 112.

Here, the elastic body 117 may be extended to provide an assistance force to the pressure rod 114.

Subsequently, when the pressure rod 114 moves in an opposite direction of the internal space 118 or when the transfer fluid pressurizes the diaphragm 112, the diaphragm 112 may be restored to an original state of FIG. 5A. That is, the protruding portion 112b may protrude toward the pressure rod 114 again to expand the internal space 118.

Although not illustrated, in other example embodiments, a distal end of piston 113 may form an airtight seal with the cylinder body 111 such that the diaphragm 112 is omitted. For example, the distal end of the piston 113 may include a rubber gasket that extends to a sidewall of the cylinder body 111 that contacts the sidewall of the cylinder body 111 with a sufficient force to resist the pressure of the transfer fluid to prevent the transfer fluid from escaping from the inner space 118 to the pressure rod 114. Further, the interior surface of the cylinder body 111 may be coated with a sealant that allows the piston 113 alone to prevent the transfer fluid from escaping from the inner space 118 to the pressure rod 114.

Figure 6:
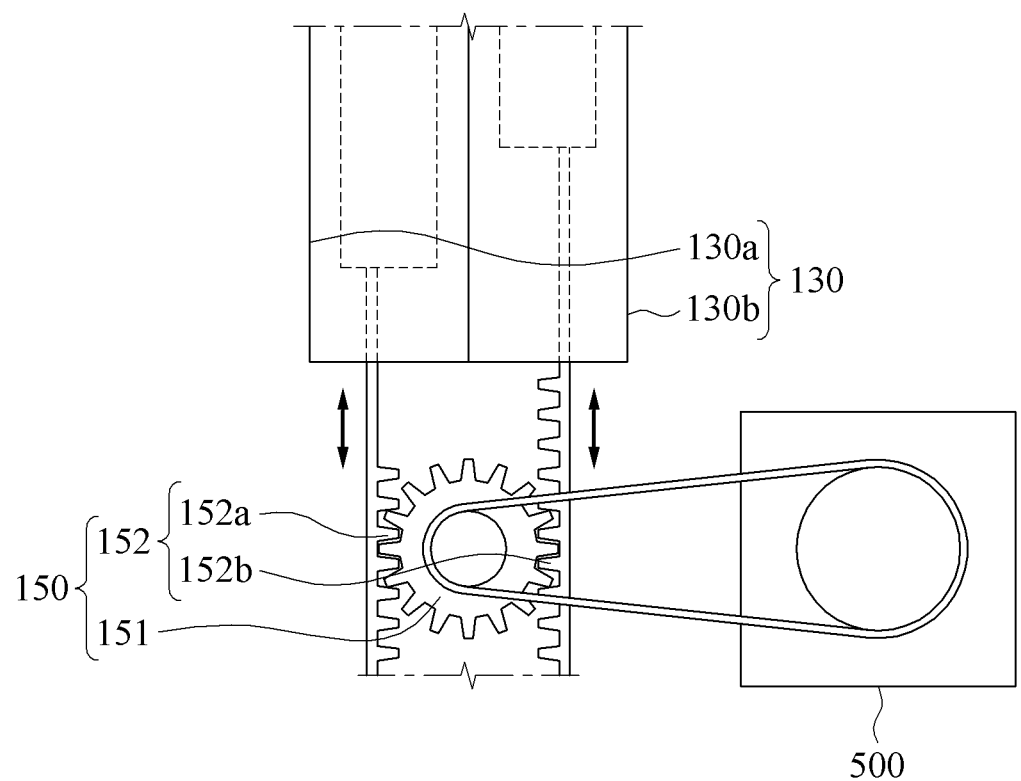
FIG. 6 illustrates an operation of an output power converting unit according to at least one example embodiment.

FIG. 6 illustrates an operation of an output power converting unit 150 according to at least one example embodiment.

Referring to FIG. 6, the output power converting unit 150 may connect the second power transmission unit 130 and the output portion 500. The output power converting unit 150 may convert a linear power delivered from the second power transmission unit 130 to a rotary power and may deliver the converted rotary power to the output portion 500.

Describing the output power converting unit 150, in response to the first power transmission unit 110 that pressurizes the transfer fluid, the transfer fluid may be delivered to the second power transmission unit 130 through the connecting unit 120. The transfer fluid may be used to drive an output pinion gear 151 by pressurizing the pressure rod 114 of the second power transmission unit 130 and by moving an output rack gear 152 connected thereto to the exterior of the second power transmission unit 130.

The second power transmission unit 130 may be configured to correspond to the first power transmission unit 110.

For example, the first power transmission unit 110 may include the first input cylinder 110a and the second input cylinder 110b, and the second power transmission unit 130 may include the first output cylinder 130a and the second output cylinder 130b. The first input cylinder 110a may be connected to the first output cylinder 130a, and the second input cylinder 110b may be connected to the second output cylinder 130b.

However, a configuration of the first power transmission unit 110 and the second power transmission unit 130 is not limited thereto. For example, a plurality of cylinders included in the first power transmission unit 110 may be connected to a single cylinder of the second power transmission unit 130. Alternatively, each of the first power transmission unit 110 and the second power transmission unit 130 may include a plurality of cylinders. The plurality of cylinders may be connected to one another to thereby configure an entire closed circuit.

The output power converting unit 150 may include a configuration similar to the aforementioned configuration of the input power converting unit 140. Unless described otherwise, the description related to the input power converting unit 140 may be applicable to the output power converting unit 150.

The output power converting unit 150 may convert the power using a rack-and-pinion structure. For example, the output power converting unit 150 may include the output rack gear 152 and the output pinion gear 151.

The output rack gear 152 may be configured to be similar to the input rack gear 142, and may be connected to the second power transmission unit 130. For example, the output rack gear 152 may be connected to the pressure rod 114 of the second power transmission unit 130.

The output rack gear 152 may be formed in the lengthwise direction of the second power transmission unit 130, and may be driven by the pressure of the transfer fluid delivered to the second power transmission unit 130.

To enhance the power transmission efficiency, the second power transmission unit 130 may include the first output cylinder 130a and the second output cylinder 130b. The first output cylinder 130a may include a configuration similar to the first input cylinder 110a and the second output cylinder 130b may include a configuration similar to the second input cylinder 110b.

The output rack gear 152 may include a first output rack gear 152a and a second output rack gear 152b. The first output rack gear 152a and the second output rack gear 152b may be formed in the lengthwise direction of the first output cylinder 130a and the second output cylinder 130b, respectively, and may be connected to the first output cylinder 130a and the second output cylinder 130b, respectively. Alternatively, the first output rack gear 152a and the second rack gear 152b may be integrally formed with the pressure rods 114 of the first output cylinder 130a and the second output cylinder 130b, respectively.

The first output rack gear 152a and the second output rack gear 152b may be formed in a shape corresponding to the output pinion gear 151. The first output rack gear 152a and the second output rack gear 152b may be disposed on both sides of the output pinion gear 151, respectively. That is, the second output rack gear 152b may be disposed to face the first output rack gear 152a based on a position of the output pinion gear 151.

The input rack gear 142 and the output rack gear 152 may be driven in opposite directions based on the connecting unit 120.

For example, in response to the first input rack gear 142a that moves inward relative to the first input cylinder 110a to thereby reduce the internal space 118 of the first input cylinder 110a, the transfer fluid may be supplied to the connecting unit 120.

While the transfer fluid supplied to the connecting unit 120 is being supplied to the first output cylinder 130a, the first output rack gear 152a may move outward relative to the first output cylinder 130a.

The first power transmission unit 110 may drive the output pinion gear 151.

Accordingly, in response to the second rack gear 152b moving inward relative to the second output cylinder 130b to reduce the internal space 118 of the second output cylinder 130b, the transfer fluid may be supplied to the connecting unit 120.

While the transfer fluid supplied to the connecting unit 120 is being supplied to the second input cylinder 130b, the first output rack gear 152a may move outward relative to the first output cylinder 130a.

The output pinion gear 151 may be driven by repeating the above operation.

The output pinion gear 151 may be connected to the output portion 500 to supply the power to the output portion 500. For example, the output pinion gear 151 and the output portion 500 may be connected using a belt. A connection method is not limited thereto.

In detail, the output portion 500 may include the joint module 510 of FIG. 1, and the output pinion gear 151 may deliver the rotary power to the joint module 510.

The external power delivered to the first power transmission unit 110 may be delivered to the output portion 500 in response to the first power transmission unit 110 that delivers the pressure of the transfer fluid to the second power transmission unit 130 through the connecting unit 120.

Figure 7:
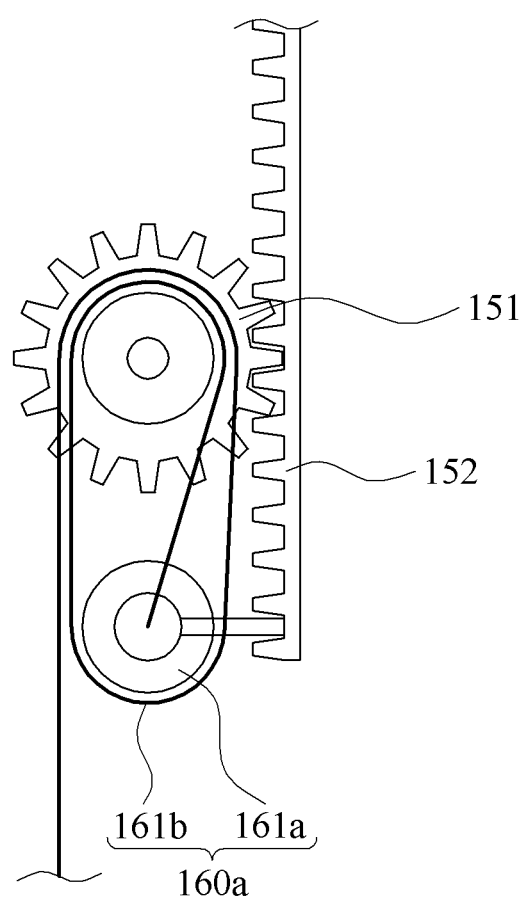
FIG. 7 illustrates an example of an output control device according to at least one example embodiment.
Figure 8:
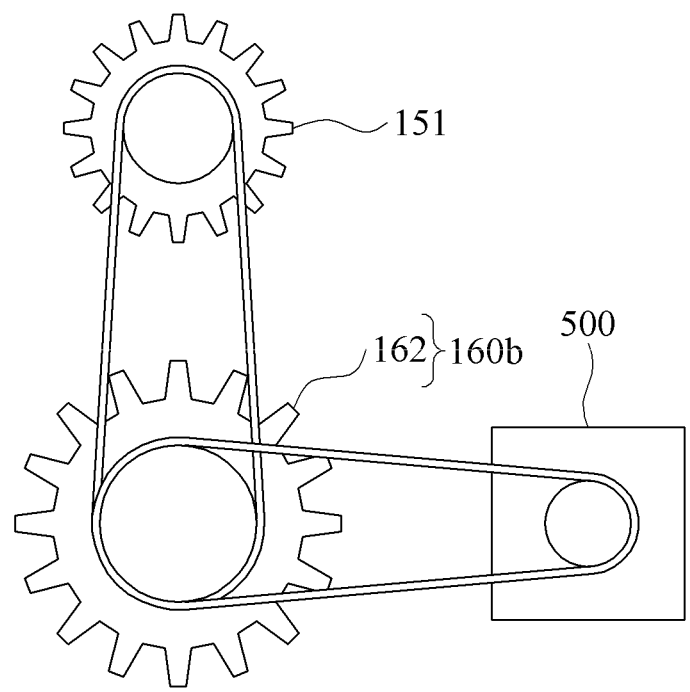
FIG. 8 illustrates another example of an output control device according to at least one example embodiment.

FIG. 7 illustrates an example of an output control device 160a according to some example embodiments, and FIG. 8 illustrates another example of an output control device 160b according to some example embodiments.

Referring to FIGS. 7 and 8, the output control device 160a, 160b may adjust a level of power to be delivered from the output power converting unit 150 to the output portion 500.

For example, the output portion 500 may require a different level of power based on a position of the output portion 500 or a type of the output portion 500. For example, when the output portion 500 is disposed to be adjacent to a femoral region, the output portion 500 may require a greater level of power compared to the output portion 500 that is disposed to be adjacent to an ankle portion. Accordingly, the required level of power may be adjusted via the output control device 160a, 160b.

Referring to FIG. 7, the output control device 160a may include a rotation pulley 161a and a cable 161b, and may include a pulley structure. For example, the cable 161b may extend from one side of the rotation pulley 161a and the extended cable 161b may be extended with winding a portion of the output pinion gear 151.

The pulley structure may be configured in such a manner that the cable 161b extends by winding a portion of the rotation pulley 161a and then winding a portion of the output pinion gear 151. The extended cable 161b may be connected to the output portion 500, and the adjusted power may be delivered to the output portion 500. Here, the rotation pulley 161a may be connected to one side of the output rack gear 152, and the rotation pulley 161a may move together with the output rack gear 152.

However, it is only an example and thus, the output control device 160a may include a plurality of rotation pulleys 161a and the cable 161b may extend with the plurality of rotation pulleys 161a.

Alternatively, the rotation pulley 161a may be configured to freely move without being fixed to one side of the output rack gear 152.

Referring to FIG. 8, the output control device 160b may include a shift gear 162.

The output pinion gear 151 may be connected to the shift gear 162 having a different gear ratio and may convert a level of power to be output. For example, the output pinion gear 151 may be connected to the shift gear 162 having a gear ratio different from that of the output pinion gear 151 and the gear ratio, and the shift gear 162 may be connected to the output portion 500.

However, it is only an example and the shift gear 162 may include a plurality of gears. For example, the shift gear 162 may include a linear gear, a planet gear, or a ring gear.

A number of example embodiments have been described above. Nevertheless, it should be understood that various modifications may be made to these example embodiments. For example, suitable results may be achieved if the described techniques are performed in a different order and/or if components in a described system, architecture, device, or circuit are combined in a different manner and/or replaced or supplemented by other components or their equivalents. Accordingly, other implementations are within the scope of the following claims.

What is claimed is:

1. A power transmission device comprising:
   a first transmission configured to receive a power from an input device;
   a second transmission configured to deliver the power to an output device; and
   an interface configured to transport a transfer agent between the first transmission and the second transmission such that a pressure associated with the transfer agent varies based on the power, wherein
      at least one of the first transmission and the second transmission includes a cylinder body having the transfer agent therein, the cylinder body including a first cylinder body and a second cylinder body, a pressure rod configured to move in a lengthwise direction of the cylinder body to press the transfer agent, and a diaphragm configured to partition an inner space of the cylinder body and to prevent the transfer agent from contacting the pressure rod; and
      the second cylinder body is configured to couple with the first cylinder body such that the second cylinder body wraps around a portion of an outer surface of the first cylinder body such that a side portion of the diaphragm is between the first cylinder body and the second cylinder body.

2. The power transmission device of claim 1, further comprising:
   an input power converter configured to,
      convert a rotary power from the input device to a linear power, and
      deliver the linear power to the first transmission.

3. The power transmission device of claim 2, wherein the input power converter comprises:
   an input pinion gear configured to rotate in response to the rotary power provided by the input device; and
   an input rack gear configured to engage the input pinion gear to move linearly in response to rotation of the input pinion gear and deliver the linear power to the first transmission.

4. The power transmission device of claim 3, wherein the input rack gear includes a first input rack gear and a second input rack gear, and the first transmission comprises:
   a first input cylinder configured to receive the linear power from the first input rack gear; and
   a second input cylinder configured to receive the linear power from the second input rack gear.

5. The power transmission device of claim 4, wherein the second input rack gear faces the first input rack gear based on a position of the input pinion gear.

6. The power transmission device of claim 1, wherein a shape of the diaphragm is such that the diaphragm includes,
   the side portion connected to an inner circumference of the cylinder body; and
   a protruding portion connected to the side portion and extending across a cross section of the cylinder body.

7. The power transmission device of claim 6, wherein the protruding portion is configured to protrude in different directions based on a pressure exerted by the pressure rod.

8. The power transmission device of claim 1, wherein the at least one of the first transmission and the second transmission comprises:
   an elastic body having a first side and a second side, the first side connected to an end surface of the cylinder body and the second side connected to the pressure rod.

9. A power transmission device comprising:
   a first transmission configured to receive a power from an input device;
   a second transmission configured to deliver the power to an output device;
   an interface configured to transport a transfer agent between the first transmission and the second transmission such that a pressure associated with the transfer agent varies based on the power;
   an output power converter configured to convert a linear power from the second transmission to a rotary power, and deliver the rotary power to the output device; and
   an output controller configured to adjust a magnitude of the rotary power delivered from the output power converter to the output device.

10. The power transmission device of claim 9, wherein the output power converter comprises:

an output rack gear configured to move linearly in response to the linear power provided by the second transmission; and an output pinion gear configured to engage the output rack gear to rotate in response to movement of the output rack gear and deliver the rotary power to the output device.

11. The power transmission device of claim 10, wherein the output rack gear includes a first output rack gear and a second output rack gear, and the second transmission comprises:

a first output cylinder configured to transmit the linear power to the first output rack gear; and a second output cylinder configured to transmit the linear power to the second output rack gear.

12. The transmission device of claim 11, wherein the second output rack gear faces the first output rack gear based on a position of the output pinion gear.

13. The transmission device of claim 9, wherein
the output power converter includes an output pinion gear, and
the output controller includes,
a rotation pulley; and
a cable configured to connect the output pinion gear and the rotation pulley.

14. The transmission device of claim 13, wherein
the output power converter includes an output rack gear, and
the rotation pulley is connected to one side of the output rack gear.

15. The transmission device of claim 13, wherein the cable extends, from the rotation pulley, around a portion of the output pinion gear a first time, around a portion of the rotation pulley and then around a portion of the output pinion gear a second time.

16. The transmission device of claim 9, wherein
the output power converter includes an output pinion gear, and
the output controller includes a shift gear connected to the output pinion gear.

* * * * *